United States Patent [19]

Crockett et al.

[11] 4,363,676

[45] Dec. 14, 1982

[54] GRANULAR FLUX FOR PIPE WELDING

[75] Inventors: Dennis D. Crockett; Robert J. Weaver, both of Mentor, Ohio

[73] Assignee: The Lincoln Electric Company, Cleveland, Ohio

[21] Appl. No.: 297,262

[22] Filed: Sep. 1, 1981

Related U.S. Application Data

[63] Continuation-in-part of Ser. No. 202,291, Oct. 30, 1980, abandoned.

[51] Int. Cl.$^3$ ............................................. B23K 35/34
[52] U.S. Cl. ..................................... 148/24; 75/257; 148/26
[58] Field of Search ................ 148/26, 24; 75/53, 257

[56] References Cited

U.S. PATENT DOCUMENTS 3,328,212  6/1967  Coless ................................... 148/26
3,340,107  9/1967  Ballass ................................... 148/26

*Primary Examiner*—P. D. Rosenberg
*Attorney, Agent, or Firm*—Meyer, Tilberry & Body

[57] ABSTRACT

An agglomerated welding flux especially designed to produce tandem arc seam welds having low profiles, increased penetration, and minimal undercutting. The flux includes: aluminum oxide and silicon dioxides in the form of kyanite; magnesium oxide; and, manganese oxide.

2 Claims, No Drawings

GRANULAR FLUX FOR PIPE WELDING

This application is a continuation-in-part of our copending application Ser. No. 202,291 filed Oct. 30, 1980 and allowed and forfeited by failure to pay the final fee.

This invention pertains to the art of electric arc welding and more particularly to an agglomerated flux composition useful for multi-arc, high speed procedures such as are used in the longitudinal seam welding of pipe.

BACKGROUND

Heretofore, fused rather than agglomerated fluxes have been used in pipe mills because of superior bead shape, penetration, and minimal undercutting obtained in this application. The reason fused fluxes perform better under these conditions is that a smaller percentage of the total heat input is consumed in melting a given mass of fused flux than agglomerated flux. In addition, less filler metal is deposited at a given current using a fused flux than with an agglomerated flux. As a result, when using a fused flux, a smaller percentage of the heat input is comsumed in melting the flux and the filler metal and a larger percentage of the heat input is available to superheat the deposited weld metal and base plate. This translates directly into increased penetration and an improved bead contour (low profile) resulting from an increase in the time required for the weld bead to solidify.

In addition to improving bead contour, the longer weld metal solidification time allows the weld pool to flow more readily to completely fill the crater cut by the welding arc. This greatly minimizes any "undercutting" tendency. This is especially advantageous for multi-arc, high speed procedures such as are used in the seam welding of pipe.

Also another desirable feature of fused flux is that it is possible to regrind slag and reuse it with little loss of performance. The reground slag of agglomerated fluxes in the past have had an excessively high melting range and will not perform satisfactorily in this application.

Fused fluxes have the disadvantage over agglomerated fluxes in that they contain a significant amount of potent glass formers such as $SiO_2$. Its use at levels usually above 30% ensure the low melting glass composition required for ease of manufacture and proper melting range for welding. These glass formers, however, are usually acidic and impart an acid character to the flux. Hence, the flux has a low basicity index which can result in the weld metal exhibiting poor notch toughness. In addition, acidic fluxes tend to lose manganese to the slag during welding while building silicon in the weld metal. Because it is extremely difficult to make alloy additions to fused fluxes as explained hereinafter, it is often necessary to use expensive high manganese electrodes with these fluxes to ensure the proper weld deposit chemistry (Mn and Si) for good notch toughness and crack resistance.

Agglomerated flux has the following inherent advantages over fused flux. It is possible to easily add deoxidizers and other metallic alloys to agglomerated flux for improved resistance to porosity and to control the final weld deposit chemistry while using a low alloy electrode. These additions are not readily made to fused fluxes as they tend to be broken down and/or oxidized during the flux manufacturing process and rendered useless. Therefore, alloy additions must be made by using expensive alloyed electrodes.

Also agglomerated fluxes are inherently lower cost than fused fluxes because they are easier to manufacture and consume less energy to produce.

THE INVENTION

The present invention contemplates an agglomerated flux that performs in a similar manner to fused flux used in pipe mills with all the formulation and manufacturing advantages found in agglomerated flux.

In accordance with the present invention, a flux of the character described is provided by employing a mixture of principal and known flux ingredients but necessarily including kyanite as a source of aluminum oxide and silicon dioxide.

Other patents describing fluxes containing substantial amounts of aluminum oxide and silicon dioxide are U.S. Pat. Nos. 2,694,023; 2,719,801; 2,748,040; 3,185,599; and 3,480,487 but the two oxides are always either present independently, as a mullite or as complex compounds other than kyanite.

Kyanite is a natural aluminum silicate. It decomposes at temperatures varying from 2012° F. (1100° C.) to 2696° F. (1483° C.) to form mullite and free silica. The chemical reaction is:

$$3(Al_2O_3 \cdot SiO_2) \rightarrow 3Al_2O_3 \cdot 2SiO_2 + SiO_2$$

Kyanite→Mullite+Silica

If we were to add $Al_2O_3$ and $SiO_2$ individually to a flux in the same proportion as they occur naturally in kyanite, the mixture would not begin melting below 3000° F. (1650° C.). Thus, by using kyanite we are able to formulate a high $Al_2O_3$ slag system that is relatively low melting.

The use of kyanite results in a low melting slag system that is also high in $Al_2O_3$. High $Al_2O_3$ levels are desirable for resistance to flash-through and, hence, make possible the reduction of flux pile heights without loss of protection against nitrogen porosity. Reduced flux pile heights improve bead shape, place less demands on flux recovery units, and permit greater accuracy in locating weld beads on semiautomatic applications. High $Al_2O_3$ levels also enhance the fast follow characteristic of a flux which is necessary for the high speed procedures typically used for the seam welding of pipe.

In addition to its low melting point, kyanite also exhibits a considerable volume increase on conversion to mullite and silica. This expansion, with cracking and exfoliation effects considered, can amount to as much as 100% or a doubling in volume. The volume increase and corresponding density decrease that result when kyanite "breaks down" to mullite and silica decreases the thermal conductivity of the slag. This means that less heat is lost by the molten weld pool to the surrounding atmosphere. Also, by virtue of the fact that the unfused flux pile is insulated to some extent from the molten weld pool by the slag, less flux will be consumed and more heat will be available to superheat the weld puddle. The net effect is increased penetration, improved weld profile, reduced undercutting tendencies and a reduced flux consumption rate.

As stated earlier, it is usually not possible to use the reground slag or prior art agglomerated fluxes as a welding flux. The primary reason for this is that most of the oxides and fluorides used to control the melting range of the flux are broken down and lost in the heat of the arc. Hence, the slag assumes a high melting character and will not perform satisfactorily as a welding flux. The kyanite containing flux of the present invention does not rely on high levels of fluoride(s) or manganese ore to control the melting range because the melting point of the kyanite is sufficiently low. Its reground slag thus assumes a slightly higher melting range, as does a fused flux, but not as high as normally found with agglomerated fluxes that have used high levels of fluoride(s) and manganese ore. The flux of the invention is particularly useful in pipe mills where the regrinding of slag is a standard practice.

FORMULATION

The following will indicate generally the ingredients in the preferred range thereof which may be used in making up our present improved arc welding composition in weight percent:

| | |
|---|---|
| MgO | 5–20 |
| $Mn_xO_y$ | 4–16 |
| $TiO_2$ | 0–8 |
| Alloys | 0–10 (b) |
| Fluorides | 1–8 |
| $ZrSiO_4$ | 0–15 |
| $SiO_2$ | 0–15 |
| $Al_2O_3$ | 0–20 |
| $Al_2O_3.SiO_2$ (Kyanite) | 20–70 |
| $Na_2O.SiO_2$ | 3–9 |

(b) As needed to match workpiece chemistry and/or mechanical property requirements.

The fluorides may be one or more of the following: calcium; magnesium, strontium; or, barium fluorides. The oxides are used as desired to control the melting and freezing temperatures.

More specifically, the following specific formulation has been found satisfactory in practice:

| | |
|---|---|
| MgO | 11.0 |
| $Mn_xO_y$ | 9.9 |
| $TiO_2$ | 3.5 |
| Alloys | 5.0 (b) |
| $CaF_2$ | 6.0 |
| $ZrSiO_4$ | 8.0 |
| $Al_2O_3.SiO_2$ (Kyanite) | 45.6 |
| $SiO_2$ | 1.5 (a) |
| $Al_2O_3$ | 2.0 (a) |
| $Fe_2O_3$ | 1.5 (a) |
| $Na_2O.SiO_2$ | 6.0 |
| | 100.0 |

(a) Present as a contaminant in raw materials.
(b) As needed to match workpiece chemistry and/or mechanical property requirements.

Alloys may include silicon, manganese, titanium, chromium, nickel, aluminum and/or other metals compatible with steel either as pure metals, ferro alloys or alloys of themselves. In selecting the amount of alloys to be used, consideration must be given to the amount of metal transferred into the weld bead due to the reduction of the oxides present in the flux, the loss of the alloys due to oxidation in the heat of the arc, and the analysis of the electrode to be used.

In the manufacture of the flux, the ingredients are all finely ground, thoroughly mixed and heated to a temperature sufficient to harden the binders but below the decomposition temperature of kyanite. A maximum temperature of 1500° F. (833° C.) is preferred.

Having thus described our invention, we now claim:

1. An agglomerated flux composition suitable for use in arc welding when deposited as a layer in the form of granular free flowing particles consisting of the following ingredients in approximately the indicated weight percentages:

| | |
|---|---|
| MgO | 5–20 |
| $Mn_xO_y$ | 4–16 |
| $TiO_2$ | 0–8 |
| Alloys | 0–10 |
| Fluorides | 1–8 |
| $ZrSiO_4$ | 0–15 |
| $SiO_2$ | 0–15 |
| $Al_2O_3$ | 0–20 |
| $Al_2O_3.SiO_2$ | 20–70 |
| $Na_2O.SiO_2$ | 3–9 | the improvements which comprise the $Al_2O_3 \cdot SiO_2$ being in the form of kyanite and the $Na_2O \cdot SiO_2$ binding the other ingredients into agglomerated granular free flowing particles.

2. An agglomerated flux composition suitable for use in arc welding when deposited as a layer in the form of granular free flowing particles consisting of the following ingredients in approximately the indicated weight percentages:

| | | |
|---|---|---|
| MgO | 11.0 | |
| $Mn_xO_y$ | 9.9 | |
| $TiO_2$ | 3.5 | |
| Alloys | 5.0 | |
| $CaF_2$ | 6.0 | |
| $ZrSiO_4$ | 8.0 | |
| $Al_2O_3.SiO_2$ | 45.6 | |
| $SiO_2$ | 1.5 | Present as impurities in the raw materials |
| $Al_2O_3$ | 2.0 | |
| $Fe_2O_3$ | 1.5 | |
| $Na_2O.SiO_2$ | 6.0 | |
| | 100.0 | | the improvements which comprise the $Al_2O_3 \cdot SiO_2$ being in the form of kyanite and the $Na_2O \cdot SiO_2$ binding the other ingredients into agglomerated granular free flowing particles.

* * * * *